US012139951B2

(12) United States Patent
Lehti

(10) Patent No.: US 12,139,951 B2
(45) Date of Patent: Nov. 12, 2024

(54) AUTOMOTIVE DOOR HINGE WITH DOOR CLOSE ASSIST

(71) Applicant: Multimatic Inc., Markham (CA)

(72) Inventor: Michael Gordon Lehti, Ashburn (CA)

(73) Assignee: MULTIMATIC INC., Markham (CA)

( * ) Notice: Subject to any disclaimer, the term of this patent is extended or adjusted under 35 U.S.C. 154(b) by 0 days.

(21) Appl. No.: 18/683,369

(22) PCT Filed: Dec. 20, 2021

(86) PCT No.: PCT/US2021/064368
§ 371 (c)(1),
(2) Date: Feb. 13, 2024

(87) PCT Pub. No.: WO2023/121645
PCT Pub. Date: Jun. 29, 2023

(65) Prior Publication Data
US 2024/0263502 A1 Aug. 8, 2024

(51) Int. Cl.
*E05F 3/22* (2006.01)
*E05F 1/12* (2006.01)
*E05D 7/10* (2006.01)

(52) U.S. Cl.
CPC .......... *E05F 1/1223* (2013.01); *E05D 7/1044* (2013.01); *E05Y 2201/638* (2013.01); *E05Y 2600/61* (2013.01); *E05Y 2900/531* (2013.01)

(58) Field of Classification Search
CPC ......... E05D 3/125; E05D 3/127; E05D 3/145; E05D 3/147; E05D 5/062; E05D 11/1007;
(Continued)

(56) References Cited

U.S. PATENT DOCUMENTS 2,890,477 A * 6/1959 Miller ................. E05D 11/1085 16/322
3,975,794 A * 8/1976 Kaiser ................... E05F 1/1223 16/303
(Continued)

FOREIGN PATENT DOCUMENTS

CN 111119628 A * 5/2020 .............. B60J 5/047
DE 2235555 A1 * 1/1974
(Continued)

OTHER PUBLICATIONS

International Search Report and Written Opinion for International Application No. PCT/US2021/064368 mailed Aug. 12, 2022.
(Continued)

*Primary Examiner* — Chuck Y Mah
(74) *Attorney, Agent, or Firm* — Carlson, Gaskey & Olds, P.C.

(57) ABSTRACT

An automotive door hinge comprises first and second brackets mountable selectively to one of the door and the body. A cam element, non-rotationally mounted to the second bracket, comprises a cam surface adapted to engage with a cam follower non-rotationally housed within a first housing of the first bracket. An energy storage means respectively stores and releases energy when the cam follower longitudinally translates within the first housing in a first direction and then in a second direction opposite the first direction. Relative rotation of the first bracket in relation to the second bracket within a predetermined angular range causes longitudinal translation of the cam follower, wherein as the door is closed, the cam follower engages the cam surface and translates longitudinally in the second direction whereby the energy stored by the energy storage means is released to assist door closure.

20 Claims, 15 Drawing Sheets

(58) Field of Classification Search

CPC ............... E05D 11/1071; E05D 11/105; E05D 11/1057; E05D 11/1042; E05D 11/06; E05C 17/045; E05C 17/12; E05C 17/16; E05C 17/18; E05C 17/203; E05C 17/206; E05C 17/24; E05C 17/025; E05C 17/04; E05F 1/14; E05F 1/1223; E05F 5/025; E05Y 2201/638; E05Y 2600/61; E05Y 2900/531

See application file for complete search history.

(56) References Cited

U.S. PATENT DOCUMENTS

| | | | | | |
|---|---|---|---|---|---|
| 4,864,687 | A * | 9/1989 | Calcaterra | E05D 7/121 | 16/334 |
| 5,398,378 | A * | 3/1995 | Lin | E05F 1/1223 | 16/303 |
| 5,444,894 | A * | 8/1995 | Heiler | E05D 11/06 | 16/257 |
| 5,966,776 | A * | 10/1999 | Ona | E05D 11/10 | 16/303 |
| 6,282,752 | B1 * | 9/2001 | Kluting | E05D 11/1085 | 16/322 |
| 6,457,207 | B1 * | 10/2002 | Horberg | E05D 11/1078 | 16/334 |
| 8,020,918 | B2 * | 9/2011 | Patzer | E05F 3/14 | 296/146.11 |
| 8,066,320 | B1 * | 11/2011 | Grabowski | E05F 1/1223 | 16/334 |
| 2002/0023313 | A1 * | 2/2002 | Parizel | E05D 11/1071 | 16/318 |
| 2002/0069481 | A1 * | 6/2002 | Ashline | E05D 11/1057 | 16/49 |
| 2003/0226237 | A1 * | 12/2003 | Johnson | E05D 11/1085 | 16/300 |
| 2006/0255045 | A1 * | 11/2006 | Kim | E05F 1/1215 | 220/531 |
| 2007/0050940 | A1 * | 3/2007 | Lowen | E05D 11/1071 | 16/334 |
| 2009/0058131 | A1 * | 3/2009 | Smith | B62D 33/03 | 296/146.11 |
| 2010/0064479 | A1 * | 3/2010 | Nicolas Domingo | E05D 11/1071 | 16/319 |
| 2012/0246875 | A1 * | 10/2012 | Lowen | E05D 11/1071 | 16/337 |
| 2016/0032634 | A1 * | 2/2016 | Jung | E05D 11/1057 | 16/342 |

FOREIGN PATENT DOCUMENTS

| | | | | |
|---|---|---|---|---|
| DE | 202020101385 U1 | | 6/2020 | |
| EP | 0124838 A2 | * | 11/1984 | |
| EP | 802293 A1 | * | 10/1997 | E05D 11/1078 |
| GB | 1397776 A | | 6/1975 | |

OTHER PUBLICATIONS

International Preliminary Report on Patentability for International Application No. PCT/US2021/064368 mailed Dec. 19, 2023.

* cited by examiner

AUTOMOTIVE DOOR HINGE WITH DOOR CLOSE ASSIST

TECHNICAL FIELD

This disclosure relates to hinges, and more particularly to automotive door hinges that facilitate closure of a vehicle door in relation to a vehicle body and separation of the vehicle door from the vehicle body.

BACKGROUND OF THE INVENTION

In general, automotive door hinges include a vehicle door component and a vehicle body component rigidly mounted onto a vehicle door and a vehicle body, respectively. In many cases, the door component is rotationally connected to the body component using a pivot pin rigidly mounted to either of the door component and the body component, the other of the door component and the body component being free to rotate about the pivot pin.

To close the door, the door component of the hinge, rigidly attached to the vehicle door, rotates in relation to the body component until the vehicle door fully latches to the vehicle body. In certain situations, complete closure of the vehicle door may be challenging due to a door closure resistance. For example, door closure resistance may be caused by an interior cabin pressure, such as in cases where all windows are closed, or by a mass of the door, such as in cases where the vehicle is parked downwards on a hill, causing the door to swing open. Door closure resistance may also be experienced during compression of door seals and full engagement of a door latch mechanism to a striker.

GB 1397776 to Guionic discloses a hinge having a door opening detent. The hinge has a greater torque requirement for door closure than for door opening which does not assist in overcoming door closure resistance. DE 202020101385U1 discloses a door hinge which also is not directed to overcoming door closure resistance.

Accordingly, it would be advantageous to create an automotive door hinge that facilitates closure of the vehicle door in relation to the vehicle body.

SUMMARY OF THE INVENTION

An aspect of the invention includes a hinge adapted to rotationally connect a vehicle door and a vehicle body, comprising: a first bracket mountable to one of the door and the body, the first bracket comprising a first housing; a second bracket mountable to the other of the door and the body; a cam element non-rotationally mounted to the second bracket comprising a cam surface adapted to engage a cam follower; the cam follower non-rotationally housed within the first housing and adapted to translate longitudinally within the first housing when engaged with the cam surface; and an energy storage means adapted to store energy when the cam follower longitudinally translates in a first direction and to release energy when the cam follower longitudinally translates in a second direction opposite to the first direction, wherein: relative rotation of the first bracket in relation to the second bracket within a predetermined angular range causes longitudinal translation of the cam follower; rotation of the first bracket past a predetermined position in relation to the second bracket as the door is opened results in abutment of a first level surface of the cam follower and a second level surface of the cam element whereby longitudinal translation of the cam follower in the first direction ceases; and rotation of the first bracket past the predetermined position in relation to the second bracket as the door is closed results in the cam follower engaging the cam surface and translating longitudinally in the second direction whereby the energy stored by the energy storage means is released to assist in closing the door.

In further aspects of the invention, the cam surface comprises at least one cam element sloped surface and the cam follower comprises at least one cam follower sloped surface adapted to engage the at least one cam element sloped surface. In further aspects of the invention, the hinge is in a closed hinge state when the cam follower can no longer move rotationally in relation to the cam element and no further energy is releasable by the energy storage means; the hinge is in a first partially open hinge state when the at least one cam follower sloped surface is engaged with the cam element sloped surface and further energy may be stored or released by the energy storage means as the door is rotated; the hinge is in a second partially open hinge state when a first level surface of the cam follower abuts a second level surface of the cam element, permitting relative rotation therebetween without further storage or release of energy by the energy storage means; and the hinge is in a full open hinge state when the cam follower can no longer move rotationally in relation to the cam element and no further energy can be stored by the energy storage means.

In further aspects of the invention, the cam element further comprises a first shaft housed within the first housing, wherein the first shaft is cylindrical; the energy storage means is adapted to encircle the first shaft; and the cam follower is adapted to encircle the first shaft so as to slidingly couple with the first shaft longitudinally and rotate in relation to the first shaft. In further aspects of the invention, the hinge further comprises holding means to engage the first shaft to restrict the cam element from translating longitudinally in the first housing. In further aspects of the invention, said holding means further causes the energy storage means to store an initial amount of energy to apply at least a predetermined amount of a preload to the cam follower. In further aspects of the invention, said holding means comprises a pin which is non-rotationally connected to the first shaft and rotates in a bushing when mounted in the first housing.

In further aspects of the invention, the cam element further comprises a second shaft which projects oppositely to the first shaft; the second shaft is seated non-rotationally within a second housing of the second bracket; and a fastening means attached to the second shaft fixes the cam element to the second housing. In further aspects of the invention, the second shaft comprises a threaded portion; and the fastening means comprises a threaded fastener adapted to engage the correspondingly threaded portion of the second shaft whereby the first bracket is separable from the second bracket by removing the fastener and releasing the second shaft from within the second housing.

In further aspects of the invention, the cam element comprises a first anti-rotation feature and the second bracket comprises a second anti-rotation feature adapted to engage the first anti-rotation feature to inhibit rotation between the cam element and the second bracket. In further aspects of the invention, the first anti-rotation feature comprises a male polygonal taper mating surface of a conical joint and the second anti-rotation feature comprises a female polygonal taper mating surface of the conical joint.

In further aspects of the invention, the hinge further comprises at least one longitudinal groove depressed into one of an interior cylindrical surface of the first housing and a circumferential surface of the cam follower and at least one spline extending longitudinally from the other of the interior cylindrical surface of the first housing and the circumferential surface of the cam follower, wherein the at least one spline is adapted to engage with and translate longitudinally within the at least one groove so as to prevent rotation of the cam follower within the first housing while facilitating longitudinal translation of the cam follower within the first housing.

In further aspects of the invention, the hinge operates in conjunction with a door checker configured to hold the door in multiple rotational positions in relation to the body. In further aspects of the invention, a second hinge connecting the door to the body comprises the door checker.

In further aspects of the invention, the energy storage means comprises a spring. In further aspects of the invention, the spring comprises a coil spring.

In further aspects of the invention, a friction between a first level surface of the cam follower and a second level surface of the cam element provides a door checking function.

In further aspects of the invention, the hinge further comprises a releasable fastening means configured to retain the first bracket and the second bracket in an assembly.

Further aspects of the invention will be apparent from the following description.

Figure 1A:
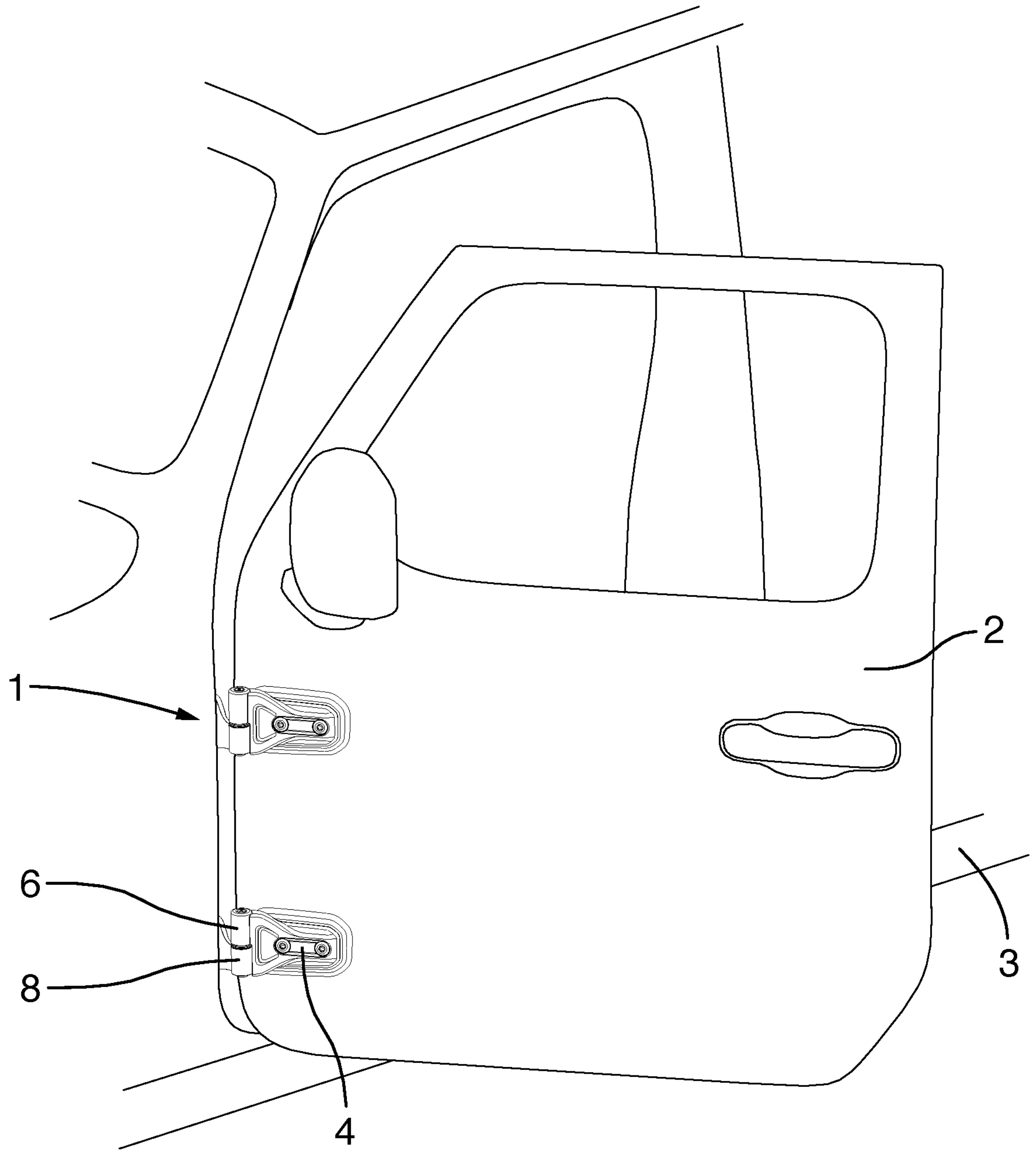
FIGS. 1A and 1B illustrate a vehicle door rotationally connected to a vehicle body using a hinge.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

An aspect of the invention includes a hinge adapted to rotationally connect a vehicle door and a vehicle body. The hinge includes a first bracket and a second bracket, each mountable to either the door or the body using any of fixed fasteners, welding, bonding, riveting or other means. In some embodiments, the first bracket may be mounted to the door and the second bracket may be mounted to the body. In other embodiments, the first bracket may be mounted to the body and the second bracket may be mounted to the door. A cam follower is non-rotationally housed within a first housing of the first bracket and is adapted to translate longitudinally within the first housing. In some embodiments, the cam follower may include a reciprocating plunger. A cam element is non-rotationally mounted to the second bracket and includes a cam surface adapted to engage the cam follower. An energy storage means is adapted to store energy when the cam follower longitudinally translates in a first direction and to release energy when the cam follower longitudinally translates in a second direction opposite to the first direction. In some embodiments, the energy storage means may include an elastic element such as a spring. The spring may be a constant rate spring or may be a variable rate spring. In a preferred embodiment, the energy storage means is a coil spring. Other possible energy storage means include compressible, elastic rubber or plastic components, compressed gas (e.g., gas cylinders) and thermal energy storage, though other energy storage means may be used as well.

Rotation of the first bracket in relation to the second bracket within a predetermined angular range causes longitudinal translation of the cam follower. As the door is opened, rotation of the first bracket causes the cam follower to rotate and engage with the cam surface. As the cam follower engages with the cam surface, the cam follower longitudinally translates in the first direction within the first housing, causing the energy storage means to store energy. In a preferred embodiment, the first bracket rotates by a predetermined amount in relation to the second bracket (e.g., 4 degrees, 5 degrees, 7 degrees, or another amount) before the cam follower engages with the cam surface. The rotational clearance allows the door to be partially opened without any reacting cam forces between the cam follower and the cam surface of the cam element. This rotational clearance may be useful during door removal wherein the first bracket and the second bracket are separated. The rotational clearance may also account for overslam. Rotation of the first bracket past a predetermined position in relation to the second bracket (e.g., 20 degrees, 30 degrees, 35 degrees, or another amount) while the door is opened results in abutment of a first level surface of the cam follower and a second level surface of the cam element, whereby longitudinal translation of the cam follower ceases. In a preferred embodiment, friction between the first level surface of the cam follower and second level surface of the cam element provides a door check function which helps keep the door open. On the other hand, as the door is closed, rotation of the first bracket past the predetermined position in relation to the second bracket results in the cam follower engaging the cam surface and translating longitudinally in the second direction. Longitudinal translation of the cam follower in the second direction causes the energy storage means to release energy, the released energy resulting in a load applied onto the cam follower that assists in closing the door.

The door close assist energy may be useful in situations requiring added effort to close the door. For example, the door close assist energy may be helpful in overcoming door closure resistance arising from interior cabin pressure (e.g., in cases where all windows are closed) or mass of the door (e.g., in cases where the vehicle is parked downwards on a hill, causing the door to swing open). The door close assist energy may also be helpful in overcoming door closure resistance during compression of the door seals and during full engagement of the door latch mechanism to the striker. In some embodiments, 3.5 J of door close assist energy may be generated when the door has 30 degrees open angle in relation to the body.

In some embodiments, the cam element includes at least one cam element sloped surface (e.g., one, two, four, or another number of cam element sloped surfaces). In some embodiments, the cam follower includes at least one cam follower sloped surface (e.g., one, two, four, or another number of cam follower sloped surfaces) adapted to engage the at least one cam element sloped surface. The number of cam follower sloped surfaces typically matches the number of cam element sloped surfaces. The hinge is in a closed hinge state when the cam follower can no longer move rotationally in relation to the cam element and no further energy is releasable by the energy storage means. The hinge is in a partially open hinge state when the at least one cam follower sloped surface is engaged with the cam element sloped surface and further energy may be stored or released by the energy storage means as the door is rotated. The hinge may continue in a partially open hinge state when the first level surface of the cam follower abuts the second level surface of the cam element, permitting relative rotation therebetween without further storage or release of energy by the energy storage means. Typically, maximum energy is stored in the energy storage means in this phase of the partially open hinge state. The hinge is in a full open hinge state when the cam follower can no longer move rotationally in relation to the cam element and no further energy can be stored by the energy storage means. The hinge is in the full open hinge state when the first bracket rotates a predetermined amount or more (e.g., 25 degrees or more or 30 degrees or more) in relation to the second bracket. In some embodiments, the at least one cam follower sloped surface is adapted to engage with the at least one cam element sloped surface after rotating the door open by a predetermined amount (e.g., 3 degrees, 5 degrees, 6 degrees, or another amount).

In some embodiments, the cam element includes a first shaft housed within the first housing. The first shaft is preferably cylindrical to facilitate rotation of the cam follower around the first shaft. The cam surface is advantageously positioned at an end of the first shaft and separated from the energy storage means by the cam follower. In some embodiments, the energy storage means is adapted to encircle the first shaft. A spring, and in particular, a coil spring is an example of such an energy storage means. In some embodiments, the cam follower is adapted to encircle the first shaft so as to slidingly couple with the first shaft longitudinally and rotate in relation to the first shaft. In such a case, the first shaft is preferably cylindrical and the cam follower has a corresponding hollow cylindrical core. In some embodiments, a holding means is used to engage the first shaft to restrict the cam element from translating longitudinally in the first housing. The holding means may cause the energy storage means to store an initial amount of energy to apply a preload to the cam follower. In some embodiments, the holding means includes a bushing mounted in the first housing and a pin adapted to fit into and rotate relative to the bushing. In some embodiments, the pin is press fitted into or onto the first shaft, causing the energy storage means to store an initial amount of energy and pre-load the cam follower. Other holding means may alternatively be used, such as a clip or a nut. In some embodiments, the cam element includes a second shaft adapted to non-rotationally sit within a second housing of the second bracket, wherein a fastening means connected to the second shaft fixes the cam element to the second housing. In some embodiments, the second shaft is threaded at a second shaft end adjacent an exterior end of the second housing distal from the first bracket. The second shaft end is accordingly also distal from the first shaft. The fastening means may comprise a threaded fastener adapted to engage the correspondingly threaded second shaft end. In some embodiments, the first bracket is separable from the second bracket by removing the fastener and releasing the second shaft from within the second housing. In other embodiments, other fastening means such as a clip or nut may be used to non-rotationally fix the cam element to the second housing. The cam element may include a disc-shaped feature adapted to sit between the first housing and the second housing. In some embodiments, a bushing is positioned between the disc-shaped feature and the first housing.

The cylindrical inner surface or bore of the first housing may include at least one longitudinal groove and the cam follower may include at least one spline extending longitudinally from a circumferential surface of the cam follower. The at least one spline is adapted to engage with and translate longitudinally within the at least one longitudinal groove to prevent rotation of the cam follower in relation to the first housing while facilitating longitudinal translation of the cam follower within the first housing. In other embodiments, the same effect is achieved when the circumferential surface of the cam follower includes the at least one longitudinal groove and the cylindrical inner surface or bore of the first housing includes the at least one spline.

In some embodiments, the cam element includes a first anti-rotation feature and the second bracket includes a second anti-rotation feature. The second anti-rotation feature is adapted to engage the first anti-rotation feature to inhibit and preferably prevent rotation between the cam element and the second bracket. In a preferred embodiment, the first anti-rotation feature includes a male polygonal taper mating surface of a conical joint and the second anti-rotation feature includes a female polygonal taper mating surface of the conical joint. In a further preferred embodiment, the first anti-rotation feature comprises one of a female square taper mating surface and a male square taper mating surface and the second anti-rotation feature comprises the other of the female square taper mating surface and the male square taper mating surface. Other means may be used to prevent rotation between the cam element and the second bracket. For instance, in one embodiment, the first anti-rotation feature includes a projection and the second anti-rotation feature includes an indentation adapted to receive the projection and prevent rotation between the cam element and the second bracket. In some embodiments, the first anti-rotation feature and the second anti-rotation feature may also be useful in aligning the door bracket with the body bracket during assembly of the door to the body.

In some embodiments, the hinge operates in conjunction with a door checker to hold the door in multiple rotational positions. A second hinge connecting the door to the body may include the door checker. An example of such a door checker is shown and described in U.S. Pat. No. 6,481,056, which is incorporated by reference in its entirety.

Figure 1B:
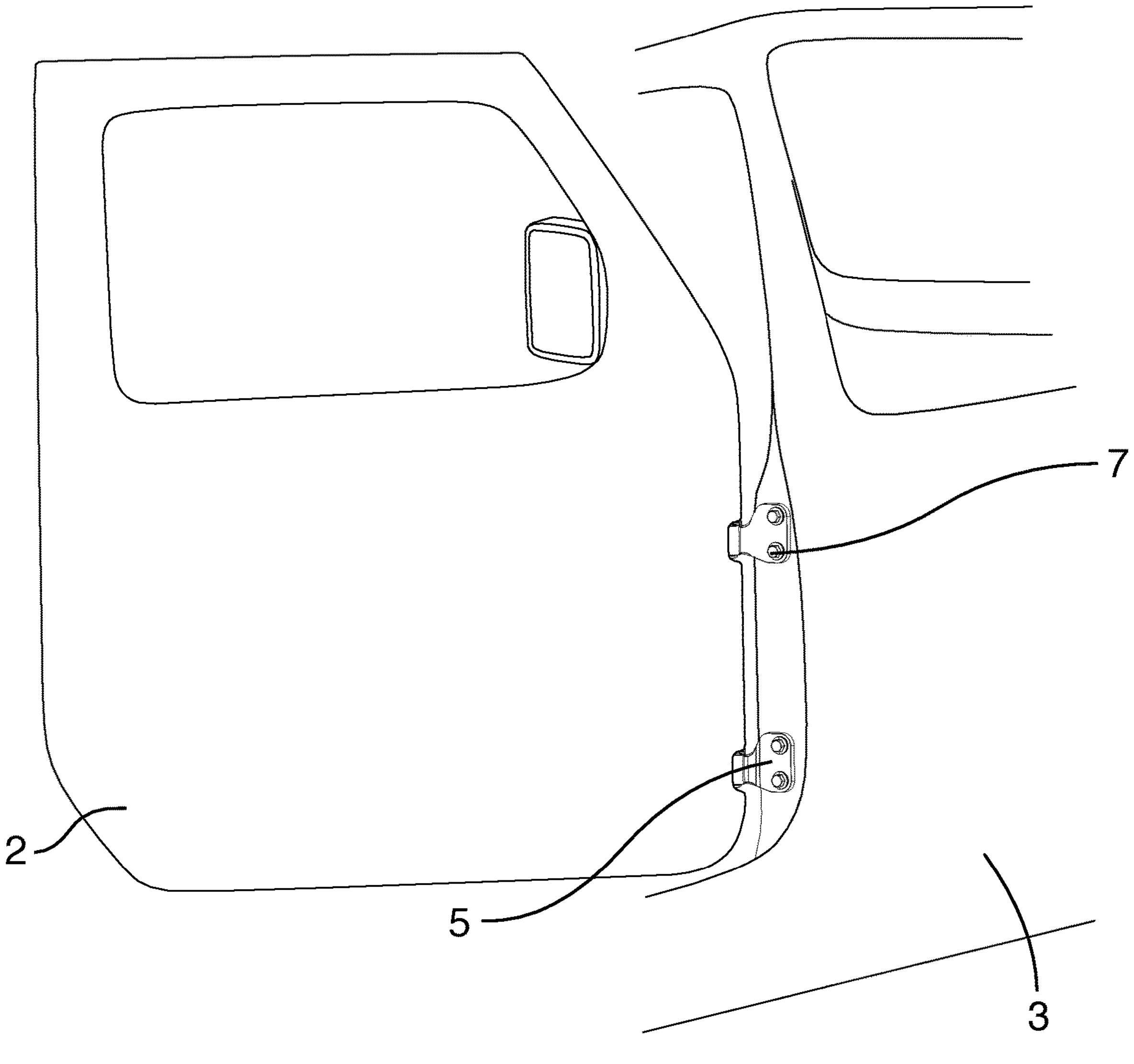

FIGS. 1A and 1B illustrate an embodiment of a hinge (1) adapted to rotationally connect a vehicle door (2) and a vehicle body (3). The hinge includes a door bracket (4) and a body bracket (5). The door bracket (4) is mountable to the vehicle door (2) and includes a door housing (6) (see FIG. 2). The door bracket is fixed to the vehicle door (2) using fixed fasteners (7). The body bracket (5) is mountable to the vehicle body (3) and includes a body housing (8) (see FIG. 2). The body bracket (5) is fixed to the vehicle body (3) using fixed fasteners (7).

Figure 2:
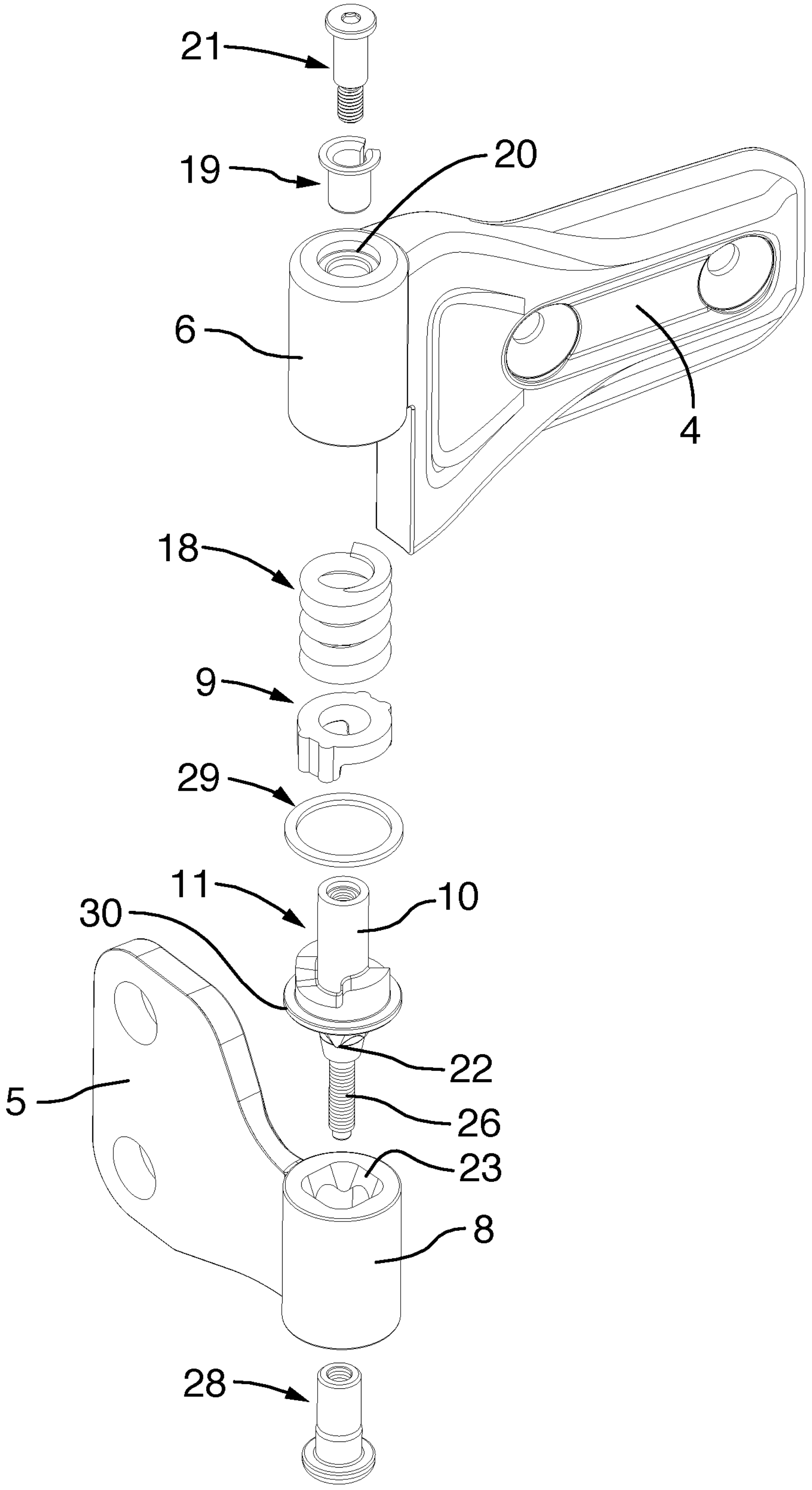
FIG. 2 illustrates components of the hinge, according to some embodiments.
Figure 3A:
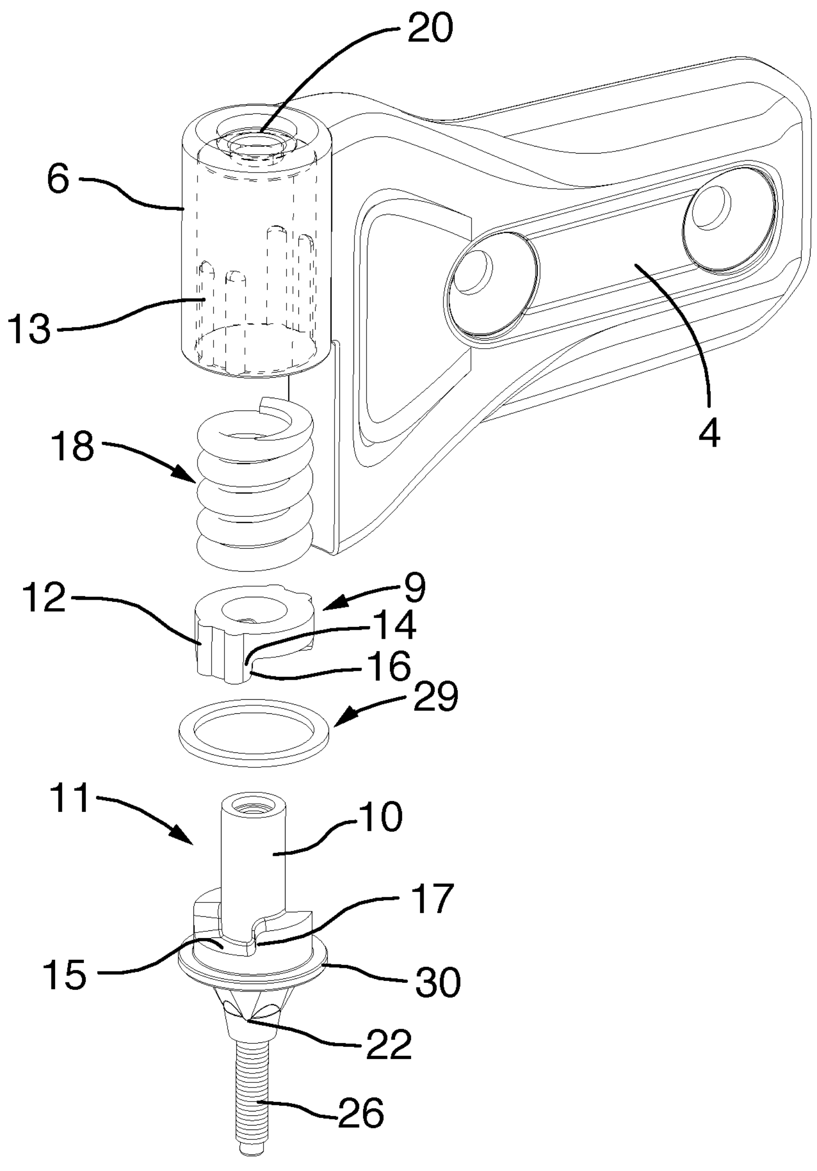
FIGS. 3A-3D, 4A, and 4B illustrate an assembly of the components of the hinge, according to some embodiments.
Figure 3B:
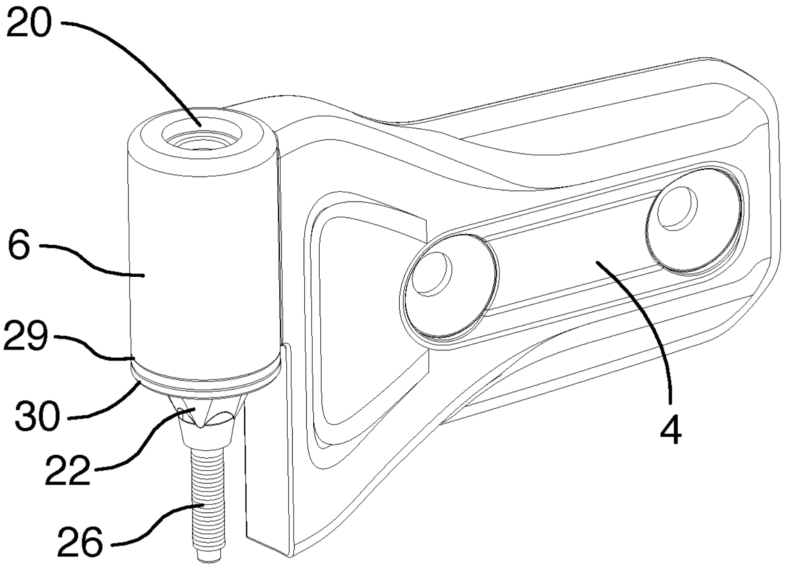
Figure 3C:
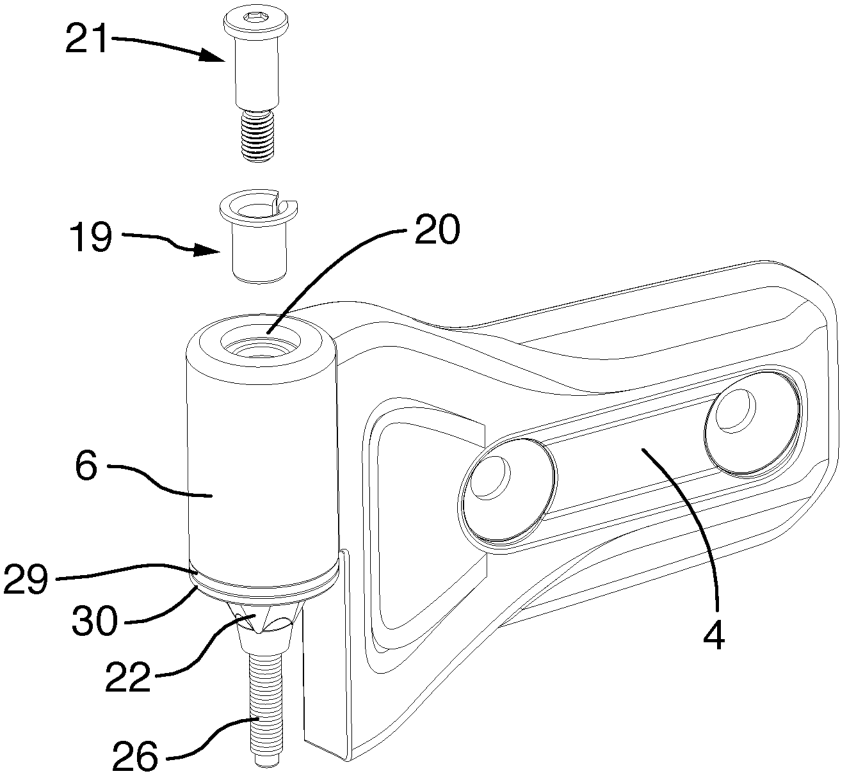
Figure 3D:
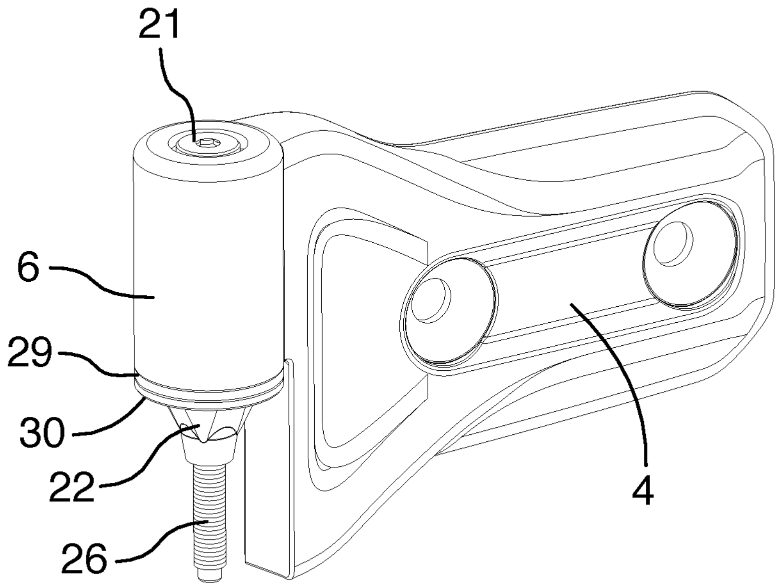
Figure 4A:
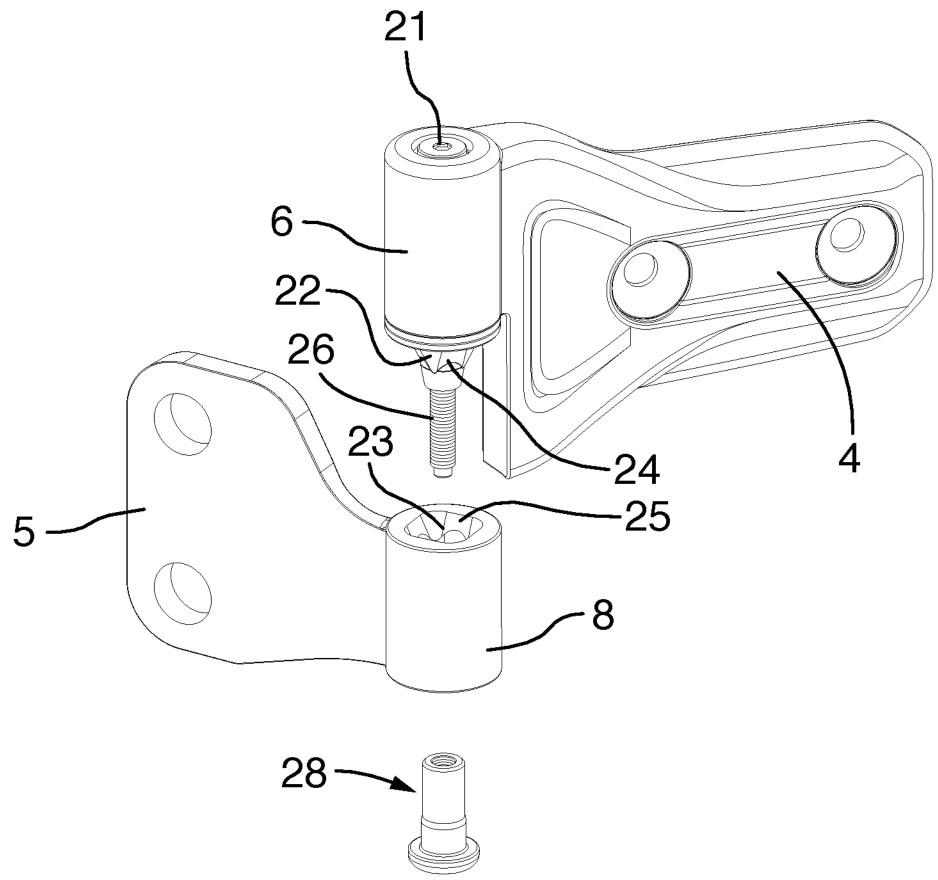
Figure 4B:
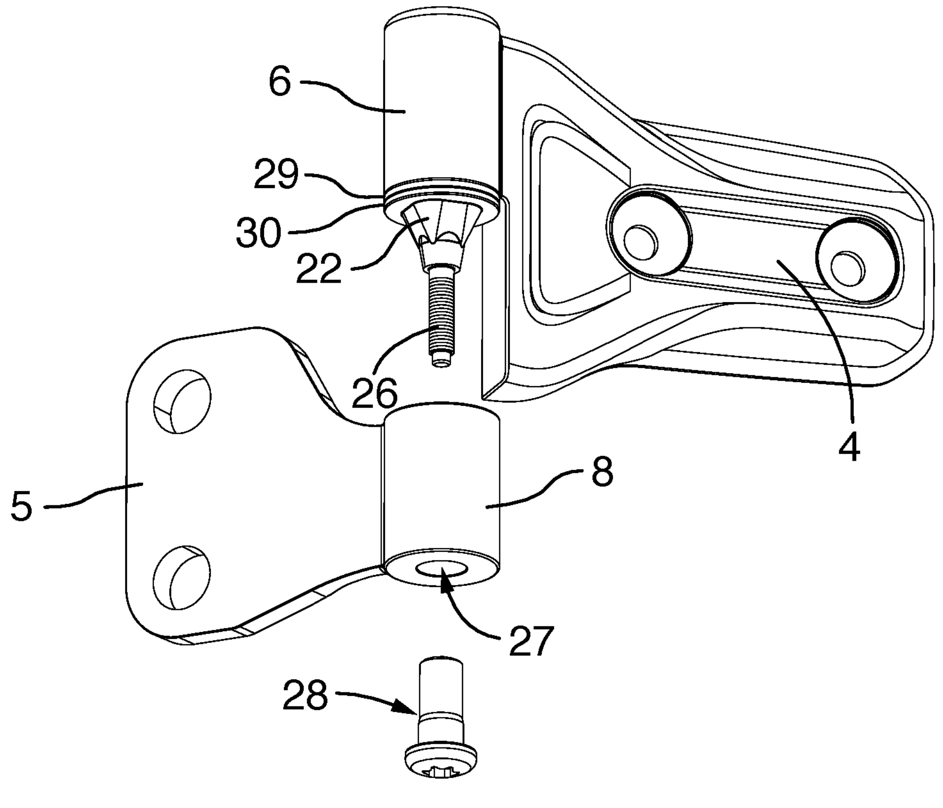

FIG. 2 illustrates an exploded view of components of the hinge (1). FIGS. 3A-D 4A, and 4B illustrate an assembly of the components of the hinge (1). A cam follower (9) is non-rotationally housed within the door housing (6). The cam follower encircles a first shaft (10) of a cam element (11) non-rotationally mounted to the body bracket (5). The cam follower (9) is adapted to translate longitudinally within the door housing (6) along the first shaft (10), similar in manner to a reciprocating plunger. The cam follower (9) includes one or more splines (12) adapted to fit within longitudinal grooves (13) of the door housing (6) to prevent the cam follower (9) from rotating in relation to the door housing (6) and allow longitudinal translation of the cam follower (9) within the door housing (6) along the first shaft (10). The cam follower (9) further includes projections (14) adapted to fit within grooves (15) of the cam element (11). The projections (14) include cam follower sloped surfaces (16) adapted to engage with cam element sloped surfaces (17) of grooves (15).

A spring (18) is housed within the door housing (6) and encircles the first shaft (10). As the door (2) is opened, the cam follower sloped surfaces (16) engage with and translate upwards along the cam element sloped surfaces (17), causing the cam follower (9) to longitudinally translate in a first direction, thereby compressing the spring (18) to store elastic energy. As the door (2) is closed, the cam follower sloped surfaces (16) engage with and translate downwards along the cam element sloped surfaces (17), causing the cam follower (9) to longitudinally translate in a second direction opposite to the first direction, thereby decompressing the spring (18) to release the elastic energy.

A bushing (19) is press fit into a hole (20) in a top surface of the door housing (6). This may be a non-friction split bushing or another appropriate form of bushing. A pin (21) fits into the bushing (19) and is press fitted into the first shaft (10) positioned within the door housing (6). Alternatively, the pin (21) may be fitted onto the first shaft (10) or threaded into or onto the first shaft (10). The result is that the door housing (6) rotates in relation to the pin (21) and the first shaft (10) as the door (2) is opened and closed. The pin (21) causes the spring (18) to compress and pre-loads the cam follower (9).

The cam element (11) further includes a conical feature (22) adapted to mate with a conical socket (23) depressed within the body housing (8). Mating surfaces of the conical feature (22) and the conical socket (23) include a male square taper mating surface (24) and a female square taper mating surface (25), respectively. The square taper mating surfaces (24) and (25) of the conical feature (22) and the conical socket (23), respectively, prevent rotation between the cam element (11) and the body bracket (5) and aid in alignment of door bracket (4) and the body bracket (5) during assembly of the hinge (1). Although square taper mating surfaces are preferred, other polygonal mating surfaces (e.g., triangular, pentagonal, etc.) may be employed.

The cam element (11) further includes a second shaft (26) adapted to sit within a vertical passage (27) of the body housing (8). The second shaft (26) is threaded in order to engage with a fastener (28). The threading may extend over the length of the second shaft, or only over part of the length of the second shaft as required. The fastener (28) is fastened onto the threaded end of the second shaft (26) to fix the cam element (11) to the body bracket (5) and rotationally connect the door (2) and body (3). The fastener (28) is internally threaded while the second shaft (26) is externally threaded. Alternatively, the fastener (28) may be externally threaded while the second shaft (26) may be internally threaded. Other means may also be used to fix the cam element (11) to the body bracket (5), however, a threaded connection is preferred as it provides intermittent, easy removal and reattachment of the door (2) to the body (3), as further described below. The fastener (28) serves to hold the door bracket (4) and the body bracket (5) in an assembly. A disc-shaped feature (30) of the cam element (11) is adapted to contact both the door housing (6) and the body housing (8). A bushing (29) is adapted to encircle the cylindrical portion of the cam element (11) between the grooves (15) and the disc-shaped feature (30) and sit on top of a surface of the disc-shaped feature (30) of the cam element (11). The bushing (29) facilitates rotation of the first housing (6) in relation to the cam element (11). In various embodiments, some portions of the cam element (11) described herein may be integral and/or some portions of the cam element (11) may be structurally fixed.

Figure 5A:
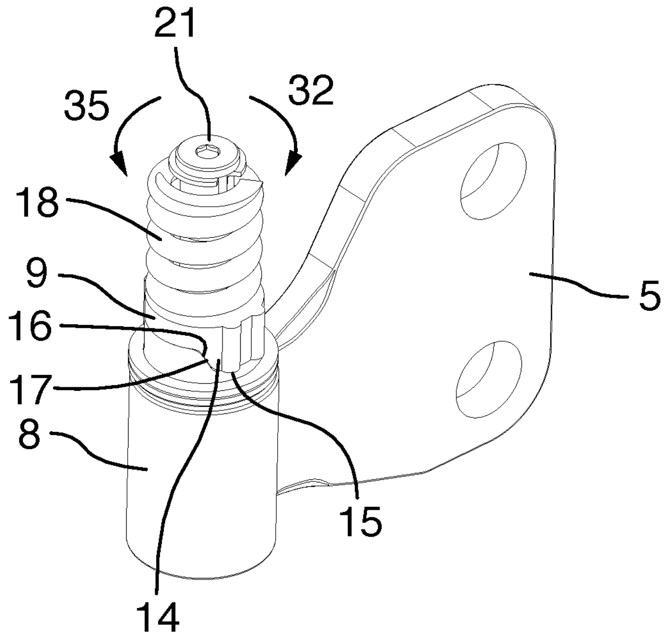
FIGS. 5A-5C illustrate a function of the hinge, according to some embodiments.
Figure 5B:
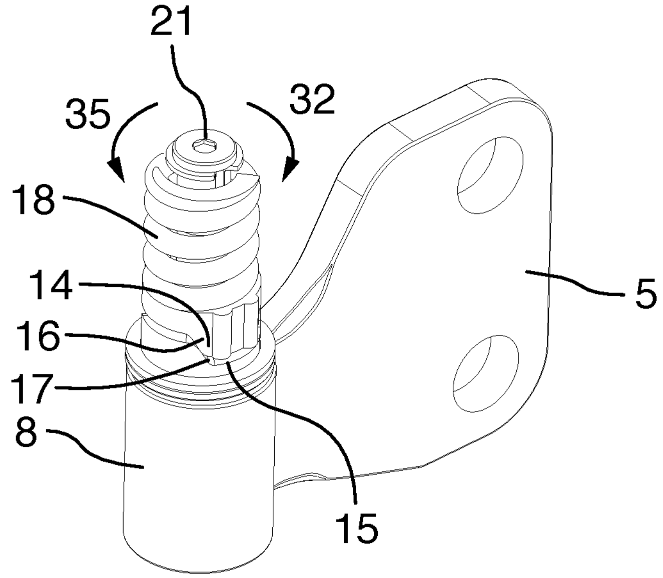
Figure 5C:
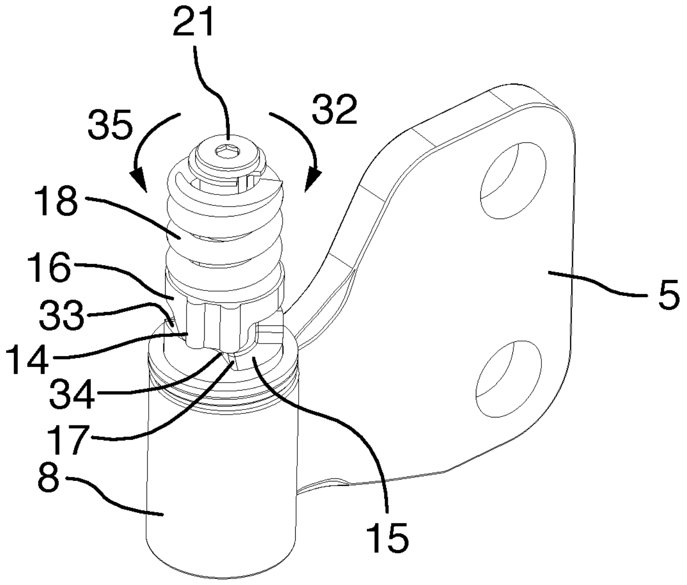

FIGS. 5A-5C illustrate a function of the hinge (1). The door bracket (4) is intentionally omitted from FIGS. 5A-5C so as to not obstruct the components housed within the door housing (6). FIG. 5A illustrates the hinge (1) in a closed hinge state wherein the projections (14) are fully seated within the respective grooves (15), the cam follower (9) can no longer move in relation to the cam element (11), no further energy is releasable by the spring (18), and the door (2) is closed. The projections (14) are adapted to fit within the grooves (15) with a predetermined rotational clearance between the cam follower sloped surfaces (16) and the cam element sloped surfaces (17).

FIG. 5B illustrates the hinge (1) in a first partially open hinge state wherein the door (2) is partially open, the cam follower sloped surfaces (16) engage the cam element sloped surfaces (17), and further energy may be stored or released by the spring (18) as the door is rotated. Rotation of the door bracket (4) in a first rotational direction (32) beyond the rotational clearance causes the cam follower (9), non-rotationally housed within the door housing (6), to rotate in the first rotational direction (32) by a same amount as the door bracket (4). As the door bracket (4) rotates to open the door (2), the cam follower sloped surfaces (16) engage with the cam element sloped surfaces (17), causing the cam follower (9) to longitudinally translate upwards into the first housing (6) and compress the spring (18).

FIG. 5C illustrates the hinge (1) in a second partially open hinge state wherein the door (2) is partially open, the projections (14) reach a level surface (33) of the cam element (11), the cam follower (9) can no longer move longitudinally in relation to the cam element (11), and essentially maximum energy is stored by the spring (18). Friction between a level surface (34) of the projections (14) and the level surface (33) of the cam element (11) provides a door check function. The hinge (1) is in the second partially open hinge state when the door bracket (4) rotates beyond a predetermined position in relation to the body bracket (5). The hinge (1) is in a fully open hinge state when the cam follower (9) can no longer move rotationally in relation to the cam element (11), and essentially maximum energy is still stored by the spring (18). Alternatively, the energy stored by the spring (18) in the fully open hinge state need not be the maximum energy stored during opening of the door (2) if a different energy storage profile is desired. The stored energy should be sufficient upon reaching the predetermined position during door closing to urge the door (2) closed, as further explained below.

During closure of the door (2), as the door bracket (4) rotates in a second rotational direction (35) opposite the first rotational direction (32) and past the predetermined position in relation to the body bracket (5), the cam follower sloped surfaces (16) engage the cam element sloped surfaces (17), causing the cam follower (9) to translate longitudinally downwards within the door housing (6) and decompress the spring (18). As the spring (18) decompresses and releases the stored energy, a load is applied onto the cam follower (9) that assists in closing the door (2). The spring force provides some propulsion to the door (2) to assist in overcoming any forces resisting complete closure of the door (2).

Figure 6A:
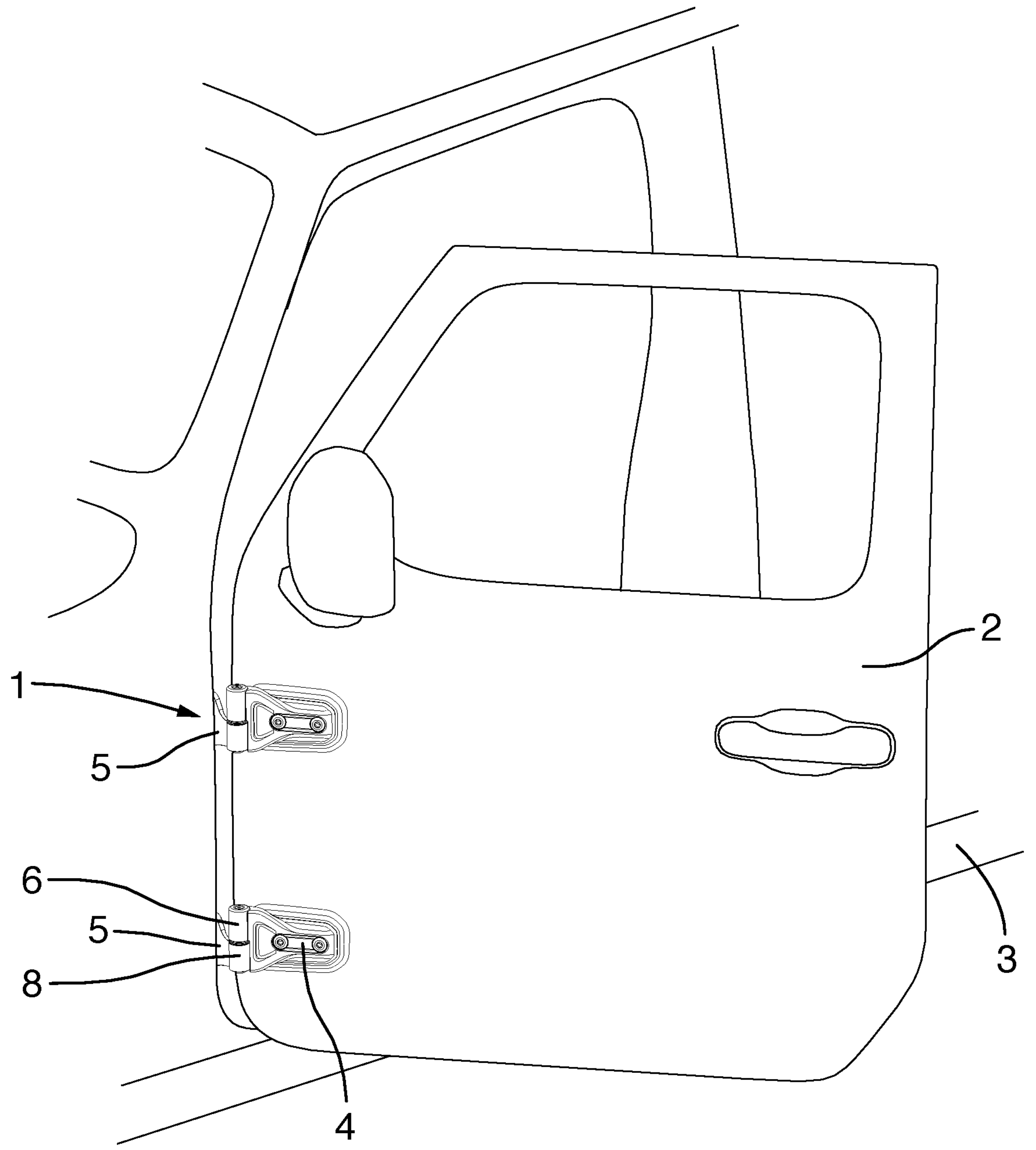
FIGS. 6A-6D illustrate a process of separating and rotationally reconnecting the vehicle door to the vehicle body, according to some embodiments.
Figure 6B:
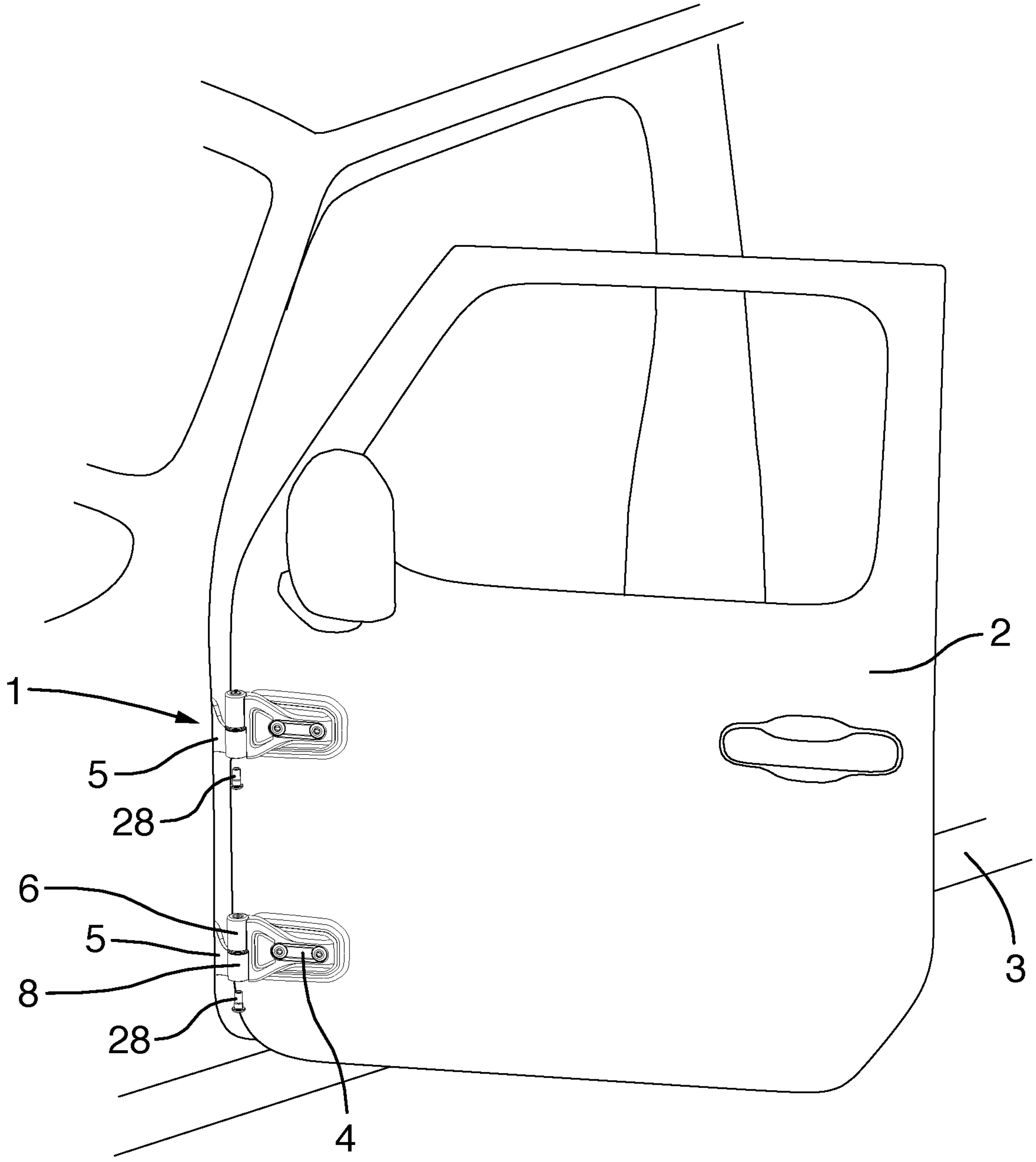
Figure 6C:
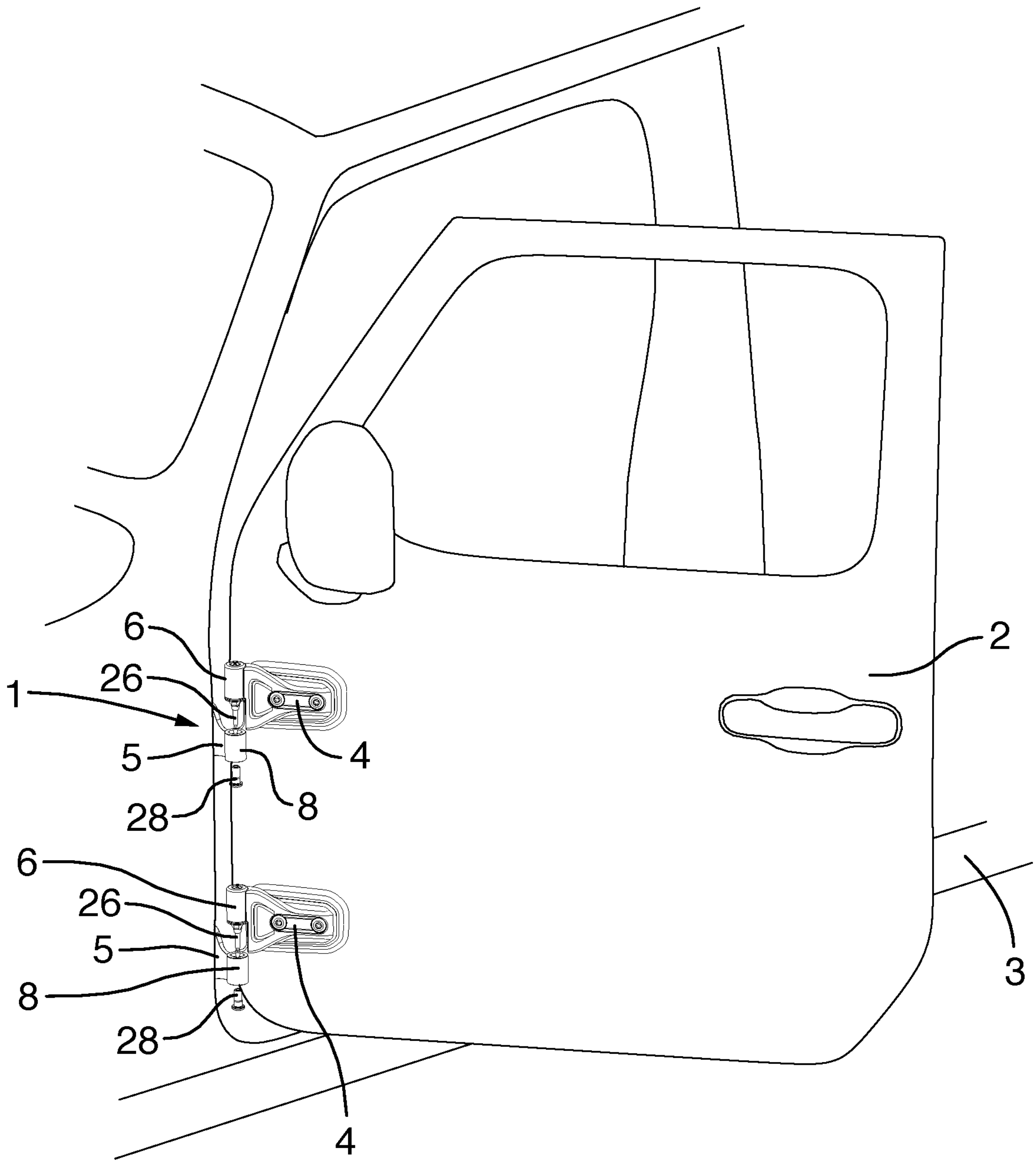
Figure 6D:
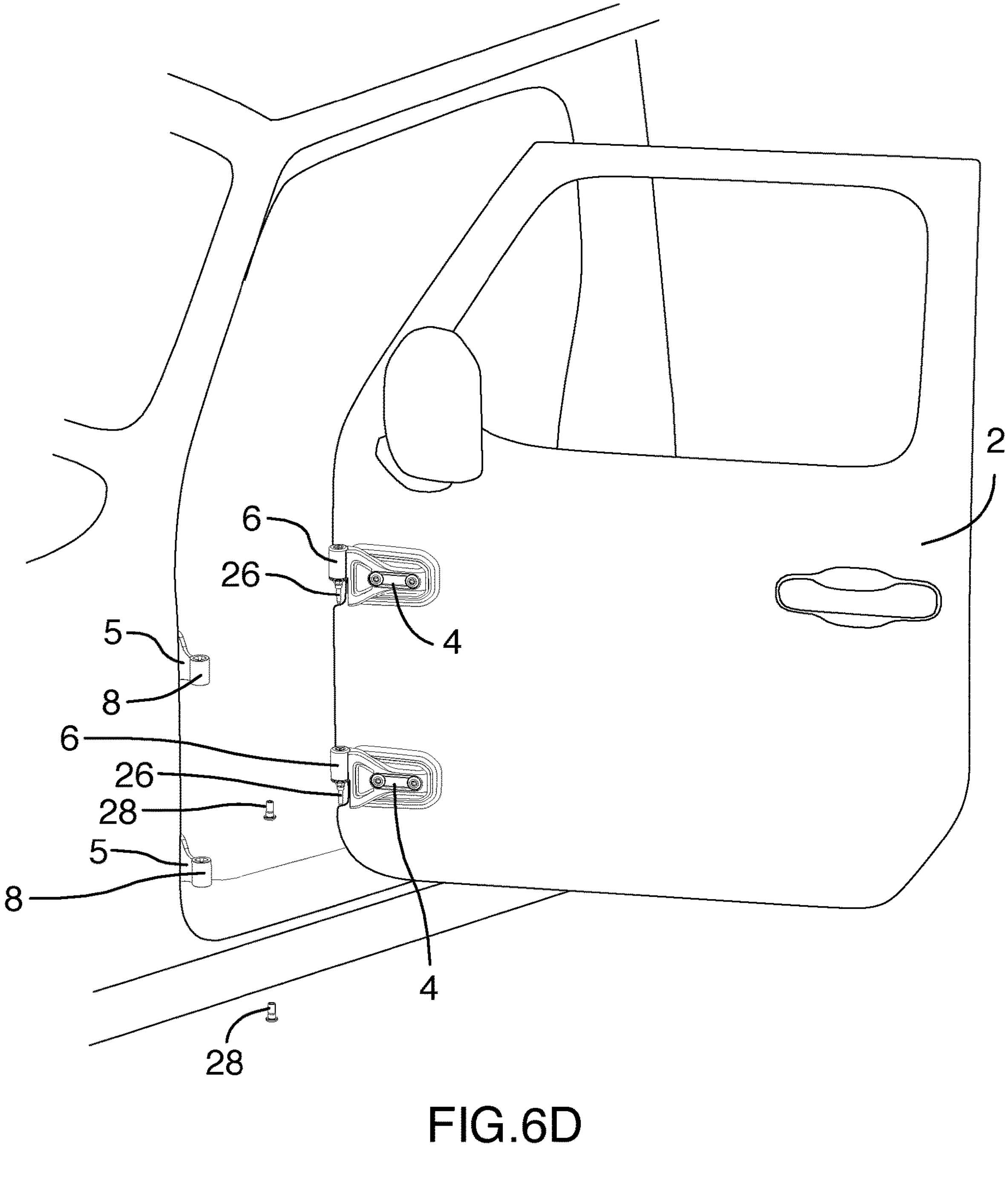

FIGS. 6A-6D illustrate an embodiment of a process for separating the door (2) from the body (3). In FIG. 6A, the door (2) is unlatched and opened. In FIG. 6B, the fasteners (28) threaded onto the threaded ends of second shafts (26) are removed. In FIG. 6C, the door (2) is lifted upwards until the second shafts (26) are released from within the body brackets (5). In FIG. 6D, the door (2) is set aside for stowage. The door (2) is rotationally reconnected to the body (3) by lifting the door (2) and lowering the second shafts (26) into the body housings (8) of the body brackets (5) until the surfaces (24) of the conical features (22) contact the surfaces (25) of the conical sockets (23). Then, to rotationally reconnect the door (2) to the body (3), the fasteners (28) are fastened to the threaded ends of the second shafts (26).

The particular arrangement of the elements described herein may be modified as will be apparent to those skilled in the art. For example, the elements may be rearranged such that the cam element is non-rotationally housed within the door housing and rotates with the door housing as the door opens and closes. In such an arrangement, the door housing and cam element rotate in relation to the cam follower. In another example, the cam element may be integral with or structurally fixed to the door housing or the body housing. Further, while in the embodiments illustrated, the cam element includes two grooves and the cam follower includes two projections, a different number of grooves and projections may be used. Further, the position of the grooves relative to one another and the position of the projections of the cam follower relative to one another may differ from what is illustrated. Similarly, a different number of longitudinal grooves and splines in or on the first housing and cam follower, respectively, may be used than illustrated herein. In addition, the position of the longitudinal grooves relative to one another and the position of the splines relative to one another may differ from what is illustrated.

In embodiments, the various components of the hinge may be manufactured using various manufacturing methods, such as stamping, forging, and casting. In embodiments, the various components of the hinge may be fabricated from various types of materials, such as metal and plastic. In some embodiments, a lubricant or a material with impregnated lubricant may be used. For example, a lubricant may be used for a metal cam follower.

Although embodiments of the invention have been illustrated, it will be apparent to the skilled workman that variations or modifications of the illustrated structure may be made without departing from the spirit or scope of the invention.

The invention claimed is:

1. A hinge adapted to rotationally connect a vehicle door and a vehicle body, comprising:

a first bracket mountable to one of the door and the body, the first bracket comprising a first housing;

a second bracket mountable to the other of the door and the body;

a cam element non-rotationally mounted to the second bracket comprising a cam surface adapted to engage a cam follower, the cam element having at least one shaft configured to rotationally couple the first bracket to the second bracket;

the cam follower non-rotationally housed within the first housing and adapted to translate longitudinally within the first housing when engaged with the cam surface; and an energy storage means adapted to store energy when the cam follower longitudinally translates in a first direction and to release energy when the cam follower longitudinally translates in a second direction opposite to the first direction, wherein:

relative rotation of the first bracket in relation to the second bracket within a predetermined angular range between the first bracket and the second bracket_ causes longitudinal translation of the cam follower;

rotation of the first bracket, in a first rotational direction, past a predetermined position beyond the predetermined angular range in relation to the second bracket as the door is opened results in abutment of a first level surface of the cam follower and a second level surface of the cam element whereby longitudinal translation of the cam follower in the first direction ceases; and rotation of the first bracket, in a second rotational direction opposite the first rotational direction, past the predetermined position in relation to the second bracket as the door is closed results in the cam follower engaging the cam surface and translating longitudinally in the second direction whereby the energy stored by the energy storage means is released to assist in closing the door.

2. The hinge of claim 1, wherein:

the cam surface comprises at least one cam element sloped surface; and the cam follower comprises at least one cam follower sloped surface adapted to engage the at least one cam element sloped surface.

3. The hinge of claim 2, wherein:

the hinge is in a closed hinge state when the cam follower can no longer move rotationally in relation to the cam element and no further energy is releasable by the energy storage means;

the hinge is in a first partially open hinge state when the at least one cam follower sloped surface is engaged with the cam element sloped surface and further energy may be stored or released by the energy storage means as the door is rotated;

the hinge is in a second partially open hinge state when the first level surface of the cam follower abuts the second level surface of the cam element, permitting relative rotation therebetween without further storage or release of energy by the energy storage means; and the hinge is in a full open hinge state when the cam follower can no longer move rotationally in relation to the cam element and no further energy can be stored by the energy storage means.

4. The hinge of claim 1, wherein the at least one shaft further comprises a first shaft housed within the first housing, wherein:

the first shaft is cylindrical;

the energy storage means is adapted to encircle the first shaft; and the cam follower is adapted to encircle the first shaft so as to slidingly couple with the first shaft longitudinally and rotate in relation to the first shaft.

5. The hinge of claim 4, further comprising:

holding means to engage the first shaft to restrict the cam element from translating longitudinally in the first housing.

6. The hinge of claim 5, wherein said holding means further causes the energy storage means to store an initial amount of energy to apply at least a predetermined amount of a preload to the cam follower.

7. The hinge of claim 5, wherein said holding means comprises a pin which is non-rotationally connected to the first shaft and rotates in a bushing when mounted in the first housing.

8. The hinge of claim 1, wherein:

the at least one shaft of the cam element further comprises a second shaft which projects oppositely to a first shaft;

the second shaft is seated non-rotationally within a second housing of the second bracket; and a fastening means attached to the second shaft fixes the cam element to the second housing.

9. The hinge of claim 8, wherein:

the second shaft comprises a threaded portion; and the fastening means comprises a threaded fastener adapted to engage the correspondingly threaded portion of the second shaft whereby the first bracket is separable from the second bracket by removing the fastener and releasing the second shaft from within the second housing.

10. The hinge of claim 1, wherein:

the cam element comprises a first anti-rotation feature; and the second bracket comprises a second anti-rotation feature adapted to engage the first anti-rotation feature to inhibit rotation between the cam element and the second bracket.

11. The hinge of claim 10, wherein:

the first anti-rotation feature comprises a male polygonal taper mating surface of a conical joint; and the second anti-rotation feature comprises a female polygonal taper mating surface of the conical joint.

12. The hinge of claim 1, further comprising:

at least one longitudinal groove depressed into one of an interior cylindrical surface of the first housing and a circumferential surface of the cam follower; and at least one spline extending longitudinally from the other of the interior cylindrical surface of the first housing and the circumferential surface of the cam follower, wherein the at least one spline is adapted to engage with and translate longitudinally within the at least one groove so as to prevent rotation of the cam follower within the first housing while facilitating longitudinal translation of the cam follower within the first housing.

13. A hinge assembly, wherein the hinge of claim 1, operates in conjunction with a door checker configured to hold the door in multiple rotational positions in relation to the body.

14. The hinge assembly of claim 13, wherein the door checker is a component of a second hinge connecting the door to the body.

15. The hinge of claim 1, wherein the energy storage means comprises a spring.

16. The hinge of claim 15, wherein the spring comprises a coil spring.

17. The hinge of claim 1, wherein a friction between the first level surface of the cam follower and the second level surface of the cam element provides a door checking function.

18. The hinge of claim 1, further comprising a releasable fastening means configured to retain the first bracket and the second bracket in an assembly.

19. The hinge of claim 1, wherein:

the cam surface comprises at least one cam element sloped surface;

the cam follower comprises at least one cam follower sloped surface adapted to engage the at least one cam element sloped surface; and the energy storage means comprises a coil spring.

20. The hinge of claim 19, wherein the cam element further comprises a first cylindrical shaft housed within the first housing, wherein:

the coil spring is adapted to encircle the first shaft; and the cam follower is adapted to encircle the first shaft so as to slidingly couple with the first shaft longitudinally and rotate in relation to the first shaft.

* * * * *